(12) United States Patent
Ahn et al.

(10) Patent No.: US 10,734,632 B2
(45) Date of Patent: Aug. 4, 2020

(54) POUCH TYPE SECONDARY BATTERY AND METHOD OF MANUFACTURING THE SAME

(71) Applicants: Hyundai Motor Company, Seoul (KR); Kia Motors Corporation, Seoul (KR)

(72) Inventors: Seung Ho Ahn, Hanam-si (KR); Sungmin Choi, Gunpo-si (KR); Sa Heum Kim, Gwacheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 230 days.

(21) Appl. No.: 16/001,619

(22) Filed: Jun. 6, 2018

(65) Prior Publication Data

US 2019/0173073 A1    Jun. 6, 2019

(30) Foreign Application Priority Data

Dec. 1, 2017 (KR) .......................... 10-2017-0163853

(51) Int. Cl.
| | |
|---|---|
| *H01M 2/34* | (2006.01) |
| *H01M 2/26* | (2006.01) |
| *H01M 2/02* | (2006.01) |
| *H01M 10/0585* | (2010.01) |
| *H01M 2/06* | (2006.01) |

(52) U.S. Cl.
CPC ........... *H01M 2/34* (2013.01); *H01M 2/0212* (2013.01); *H01M 2/0267* (2013.01); *H01M 2/0275* (2013.01); *H01M 2/06* (2013.01); *H01M 2/26* (2013.01); *H01M 2/345* (2013.01); *H01M 10/0585* (2013.01); *H01M 2220/30* (2013.01)

(58) Field of Classification Search
CPC ........ H01M 2/34; H01M 2/26; H01M 2/0267; H01M 2/0212; H01M 2/345; H01M 2/06; H01M 2/0275; H01M 10/0585; H01M 2220/30
See application file for complete search history.

(56) References Cited

U.S. PATENT DOCUMENTS

| 10,170,745 B2* | 1/2019 | Moon ...................... H01M 2/34 |
| 10,193,189 B2* | 1/2019 | Choi ..................... H01M 2/345 |
| 2018/0062131 A1* | 3/2018 | Cho ........................ H01M 2/26 |

* cited by examiner

*Primary Examiner* — Stephen J Yanchuk
(74) *Attorney, Agent, or Firm* — Morgan, Lewis & Bockius LLP

(57) ABSTRACT

A pouch type secondary battery may include an electrode assembly, electrode tabs connected to the electrode assembly, a pouch case to accommodate the electrode assembly and the electrode tabs in a sealed state, and lead tabs extending to the outside by passing through the pouch case in a state of being connected to the electrode tabs, wherein the lead tabs include a bending connection portion provided in the pouch case, and a breaking portion provided on a side of the bending connection portion to have a relatively small cross-sectional area and being broken when an overcurrent is applied or the pouch case expands.

9 Claims, 9 Drawing Sheets

POUCH TYPE SECONDARY BATTERY AND METHOD OF MANUFACTURING THE SAME

CROSS-REFERENCE TO RELATED APPLICATION(S)

The present application claims priority to Korean Patent Application No. 10-2017-0163853, filed on Dec. 1, 2017 in the Korean Intellectual Property Office, the entire contents of which is incorporated herein for all purposes by this reference.

BACKGROUND OF THE INVENTION

Field of the Invention

The present invention relates to a pouch-type secondary battery and a method of manufacturing the same configured for minimizing a space occupied by a connection portion of an electrode tab and a lead tab in a pouch case.

Description of Related Art

Chargeable and dischargeable secondary batteries are widely used not only as energy sources for mobile devices but also as energy sources in various industrial fields such as electric vehicles and hybrid vehicles.

Secondary batteries may be classified into a cylindrical type, a rectangular type, and a pouch type depending on the shape. Among them, pouch-type secondary batteries are used in various fields because they have high energy density per unit weight, low cost, and easy deformation.

The pouch type secondary battery may include an electrode assembly having a positive electrode plate, a negative electrode plate and a separator, positive and negative electrode tabs connected to the electrode assembly, a pouch case for housing the electrode assembly in a sealed state, and lead tabs extending outwardly of the pouch case in a state of being connected to each electrode tab.

Such a pouch-type secondary battery may be overheated in an abnormal state such as overcharging, exposure to a high temperature, dropping, or the like, resulting in the expansion of the internal gas, or explosion. Therefore, it is important to take safety measures to prevent the overheating or explosion of the pouch type secondary battery.

Conventionally, when the pouch case expands due to overheating or the like, the lead tab is broken so that the current flow is interrupted. However, the pouch type secondary battery having a safety means may be bulky because it needs to secure not only a space for connecting the electrode tab and the lead tab in the pouch case but also a space for arranging the safety means. That is, there is a limit to increase the energy density because a dead space (space for connection of the electrode tab, etc.) outside the space occupied by the electrode assembly in the pouch case is increased.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a pouch-type secondary battery and a method of manufacturing the same, which are configured for increasing the energy density by minimizing spaces occupied by a connection portion of an electrode tab and a lead tab, and a safety means.

Additional various aspects of the present invention will be set forth in part in the description which follows and, in part, will be obvious from the description, or may be learned by practice of the disclosure.

In accordance with one aspect of the present invention, there may be provided a pouch type secondary battery including: an electrode assembly; electrode tabs connected to the electrode assembly; a pouch case to accommodate the electrode assembly and the electrode tabs in a sealed state; and lead tabs extending to the outside by passing through the pouch case in a state of being connected to the electrode tabs, wherein the lead tabs include a bending connection portion provided in the pouch case; and a breaking portion provided on one side of the bending connection portion to have a relatively small cross-sectional area and being broken when an overcurrent is applied or the pouch case expands.

The pouch case may include a body covering a circumference of the electrode assembly; and covers sealingly coupled to both end openings of the body and through which the lead tabs penetrate.

Both the end openings of the body and the covers may be sealingly coupled by sealants attached to circumferences of the covers.

The lead tab may be integrally coupled to the cover when the cover is molded, and the bending connection portion may be positioned inside the cover.

The bending connection portion may be bent in an 'S' shape, and the breaking portion may be provided in a notch form on one side adjacent to the cover.

In accordance with another aspect of the present invention, there may be provided a method of manufacturing a pouch type secondary battery including: a body coupling process of coupling a body of a pouch case to a circumference of an electrode assembly provided with electrode tabs; a cover molding process of molding covers of the pouch case in an integrated state with lead tabs; a lead tab coupling process of coupling the lead tabs to the electrode tabs; a lead tab bending process of bending the lead tabs between the covers and the electrode tabs to form bending connection portions; and a cover coupling process of sealingly coupling circumferences of the covers to both ends of the body after forming the bending connection portions.

In accordance with another aspect of the present invention, there may be provided a method of manufacturing a pouch type secondary battery including: a cover molding process of molding covers of a pouch case in an integrated state with lead tabs; a lead tab coupling process of coupling the lead tabs to electrode tabs connected to an electrode assembly; a lead tab bending process of bending the lead tabs between the covers and the electrode tabs to form bending connection portions; and a body coupling process of coupling a body of the pouch case to a circumference of the electrode assembly after forming the bending connection portions and at the same time sealingly coupling both ends of the body to a circumference of the covers.

The method of manufacturing a pouch type secondary battery may further include a breaking portion forming process of forming breaking portions of a notch shape on the lead tabs before the cover molding process.

The methods and apparatuses of the present invention have other features and advantages which will be apparent from or are set forth in more detail in the accompanying drawings, which are incorporated herein, and the following

Figure 1:
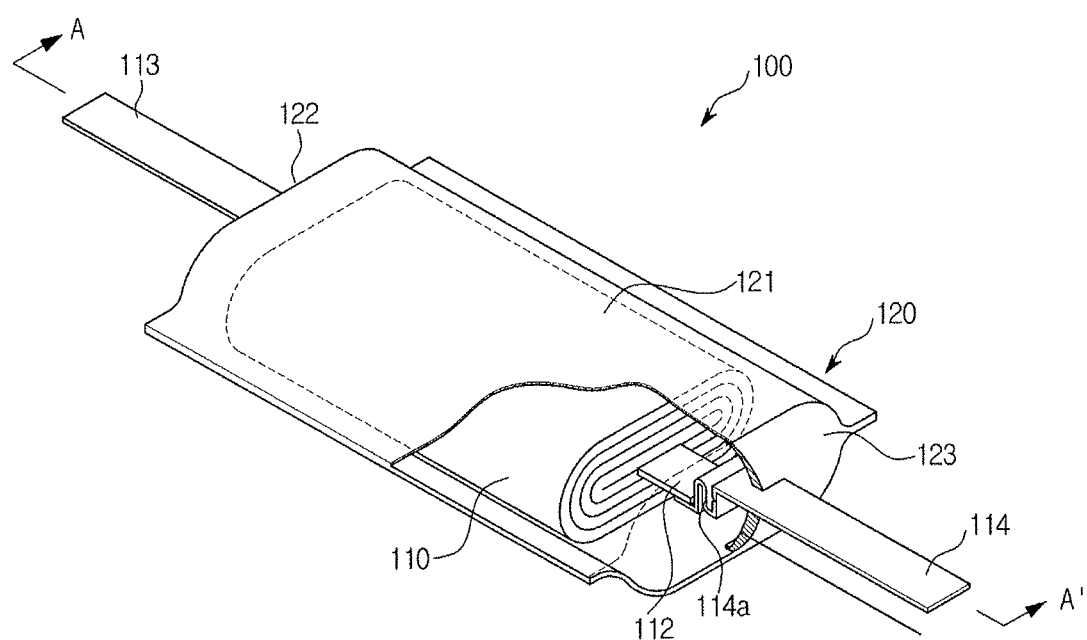
FIG. 1 is a perspective view of a pouch type secondary battery according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Hereinafter, embodiments of the present invention will be described in detail with reference to the accompanying drawings. The following embodiments are provided to fully convey the spirit of the present invention to a person having ordinary skill in the art to which the present invention belongs. The present invention is not limited to the exemplary embodiments shown herein but may be embodied in other forms. The drawings are not intended to limit the scope of the present invention in any way, and the size of components may be exaggerated for clarity of illustration.

Figure 2:
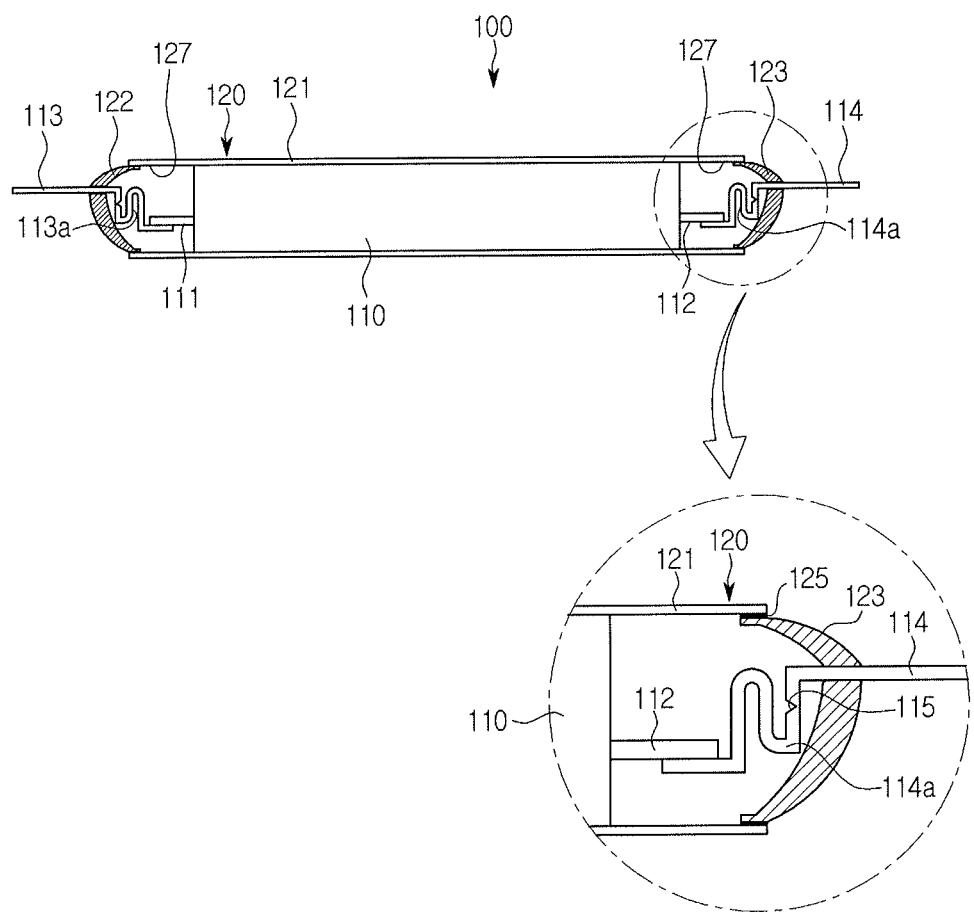
FIG. 2 is a cross-sectional view taken along line A-A' in FIG. 1.

FIG. 1 is a perspective view of a pouch type secondary battery according to an exemplary embodiment of the present invention, and FIG. 2 is a cross-sectional view taken along line A-A' in FIG. 1.

Referring to FIG. 1 and FIG. 2, a pouch type secondary battery 100 may include an electrode assembly 110, a pouch case 120 to accommodate the electrode assembly 110 in a sealed state, positive and negative electrode tabs 111 and 112 extending to the outside of the electrode assembly 110 from both ends of the electrode assembly 110, respectively, and lead tabs 113 and 114 extending outwardly of the pouch case 120 in a state of being connected to the electrode tabs 111 and 112.

The electrode assembly 110 may include a positive plate, a negative plate, and a separator. The electrode assembly 110 may have a structure in which a positive electrode plate and a negative electrode plate are sequentially stacked with a separator interposed therebetween. Furthermore, the electrode assembly 110 may be a winding-type electrode assembly in which the long sheet-like positive electrode plate and the negative electrode plate are wound with a separator interposed therebetween, or may be a stack folding type electrode assembly in which a bi-cell or a full cell, in which the positive electrode plate and the negative electrode plate of a predetermined unit are stacked with the separator interposed therebetween, are wound.

The positive electrode plate may include a positive electrode current collector including a thin metal plate having excellent conductivity, for example, an aluminum foil, and a positive electrode active material layer coated on both surfaces thereof. The positive electrode plate may have the positive electrode current collector region on both surfaces of which the positive electrode active material layer is not formed, that is, a positive electrode uncoated region. The positive electrode tab 111 including a metal material, for example, aluminum (Al) may be bonded to one end portion of the positive electrode uncoated portion of the positive electrode plate.

The negative electrode plate may include a negative electrode current collector including a conductive metal thin plate, for example, a copper (Cu) foil, and a negative electrode active material layer coated on both surfaces thereof. The negative electrode plate has the negative electrode current collector region on both surfaces of which the negative electrode active material layer is not formed, that is, a negative electrode uncoated portion. The negative electrode tab 112 including a metal material, for example, nickel (Ni), may be bonded to one end portion of the negative electrode plate.

The separator is disposed between the positive electrode plate and the negative electrode plate, and may be formed in a form of a porous membrane to electrically insulate the positive electrode plate and the negative electrode plate from each other and to allow lithium ions and the like to pass between the positive electrode plate and the negative electrode plate. Such a separator may include a porous membrane using polyethylene (PE), polypropylene (PP), or a composite film thereof.

The pouch case 120 for sealing the electrode assembly 110 may include a body 121 surrounding and sealing a circumference of the electrode assembly 110, and covers 122 and 123 sealingly coupled to openings 127 at both end portions of the body 121. The body 121 may be formed of a soft material such as an aluminum laminate sheet. The covers 122 and 123 may be provided by injection molding of a resin material to correspond to the sizes of the openings 127 at both end portions of the body 121. Circumferences of the covers 122 and 123 are sealingly coupled to both end portions of the body 121 by a sealant 125 as shown in FIG. 2.

The electrode tabs 111 and 112 are respectively provided at both end portions of the electrode assembly 110 facing the covers 122 and 123 and are respectively connected to the lead tabs 113 and 114 extending to the outside of the pouch case 120. That is, the lead tabs 113 and 114 extend to the outside through the covers 122 and 123 of the pouch case 120 in a state of being connected to the electrode tabs 111 and 112. The lead tabs 113 and 114 may be inserted into the mold in a process of molding the covers 122 and 123 through injection molding so that the intermediate parts thereof are combined with the covers 122 and 123 integrally.

The lead tabs 113 and 114 include bending connection portions 113a and 114a, and breaking portions 115. The bending connection portions 113a and 114a are formed by the bending deformation of the lead tabs 113 and 114 at positions between the electrode tabs 111 and 112 and the covers 122 and 123. The breaking portions 115 may be provided in a notch form having a relatively small cross-sectional area on one side of the bending connection portions 113a and 114a.

Figure 5:
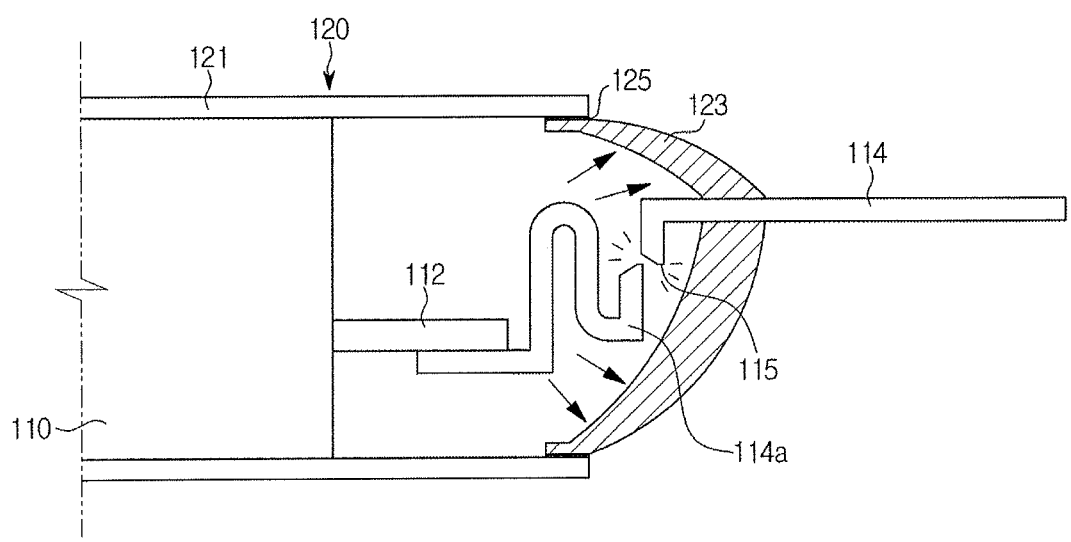
FIG. 5 illustrates a state in which a breaking portion of a lead tab is broken when a pouch type secondary battery according to an exemplary embodiment of the present invention expands.

As shown in FIG. 5, by such a structure of the pouch type secondary battery 100, when an overcurrent or overcharge occurs, gas is generated inside the pouch case 120, the internal pressure of the pouch case 120 increases, and the covers 122 and 123 of the pouch case 120 are expanded due to the increase of the internal pressure, and thus the breaking portions 115 are broken so that the flow of the current is cut off. Accordingly, the explosion of the pouch type secondary battery 100 may be prevented. The breaking portions 115 may be provided at positions adjacent to the covers 122 and 123 so that the breaking portions 115 may be broken when the covers 122 and 123 expand.

With the above configuration, the breaking portions 115 are disposed close to the electrode tabs 111 and 112 by the bending connection portions 113a and 114a having at least one bent portion so that the spaces occupied by the connecting portions of the electrode tabs 111 and 112 and the lead tabs 113 and 114, and the breaking portions 115 in the pouch case 120 are minimized.

Figure 9:
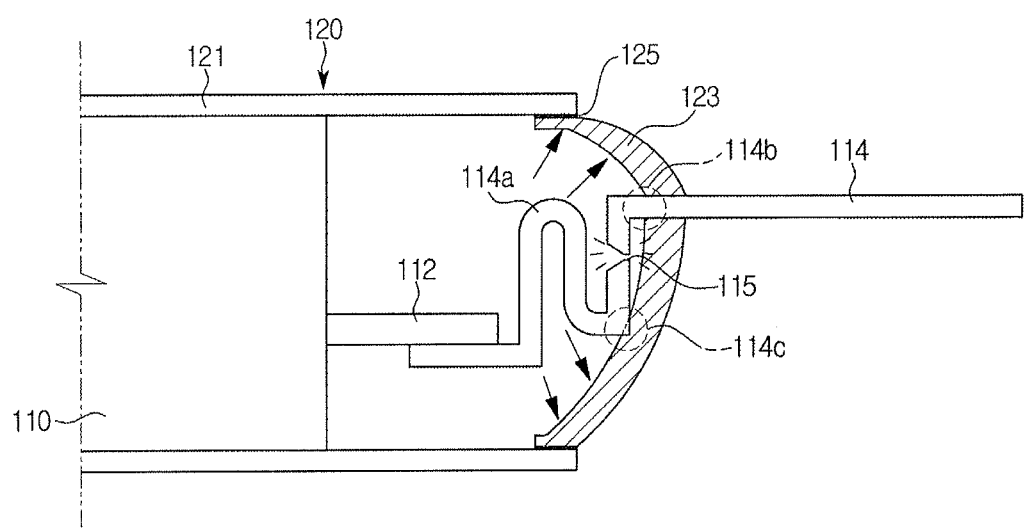
FIG. 9 illustrates a modified example of coupling portions of a cover and a lead tab of a pouch type secondary battery according to an exemplary embodiment of the present invention.

FIG. 9 illustrates a modified example of coupling portions of the cover 123 and the lead tab 114. In the example of FIG. 9, both sides of the bending connection portion 114a of the lead tab 114 are fixed to the cover 123 with the breaking portion 115 interposed therebetween in a process of molding the cover 123. That is, the lead tab 114 may be fixed to the cover 123 by a first portion 114b extending outwardly of the cover 123 and a second portion 114c of one side of the bending connection portion 114a with the breaking portion 115 interposed therebetween. In the instant case, if the cover 123 is deformed to expand by the pressure rise inside the pouch case 120, the breaking portion 115 may be easily broken.

Hereinafter, a method of manufacturing such a pouch type secondary battery will be described.

Figure 6:
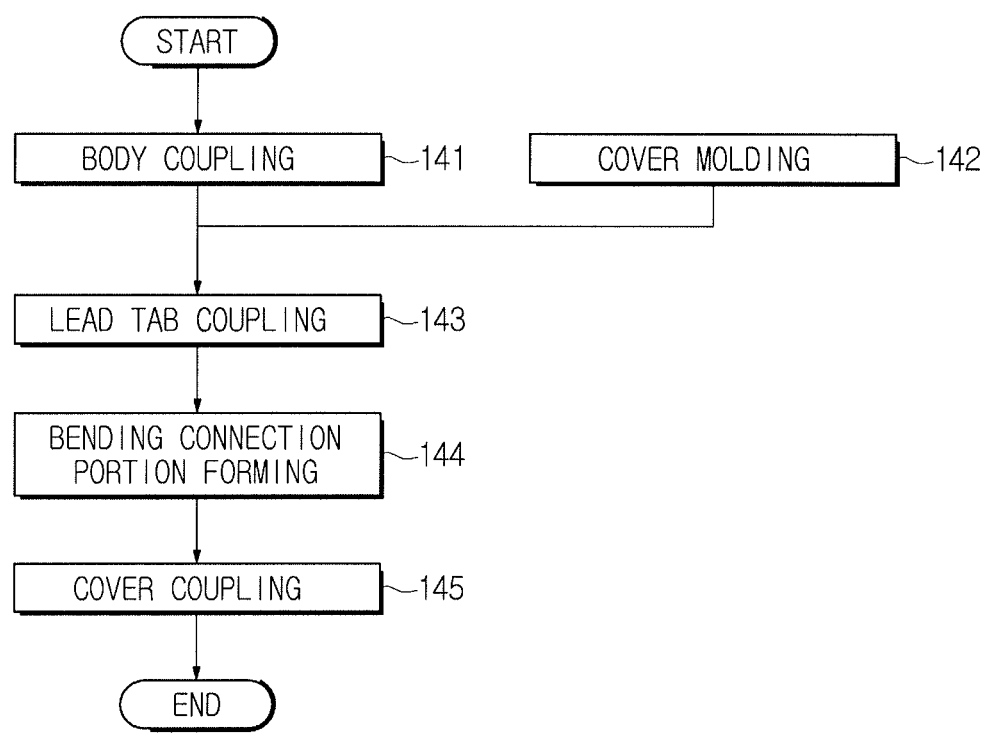
FIG. 6 illustrates a method of manufacturing a pouch type secondary battery according to an exemplary embodiment of the present invention.

As shown in FIG. 6, a method of manufacturing the pouch type secondary battery 100 may include a body coupling process 141, a cover molding process 142, a lead tab coupling process 143, a bending connection portion forming process 144, and a cover coupling process 145.

As shown in FIG. 1 and FIG. 2, in the body coupling process 141, the body 121 of the pouch case 120 is coupled to the electrode assembly 110 to enclose and seal the electrode assembly 110 having the electrode tabs 111 and 112 on both end portions thereof. In the present way, the body 121 covers the circumference of the electrode assembly 110 in a sealed state with both end portions thereof opened. Further. Furthermore, the electrode tabs 111 and 112 are also positioned inside the body 121.

As shown in FIG. 6, the cover molding process 142 may be performed in a separate process at the same time as or before the body coupling process 141. In the cover molding process 142, the covers 122 and 123 are formed through injection molding in a state in which the lead tabs 113 and 114 are inserted into a mold. In the present way, the lead tabs 113 and 114 and the covers 122 and 123 may be manufactured in an integrated state.

The breaking portions 115 provided on the lead tabs 113 and 114 may be formed in a notch form on the surface of the lead tabs 113 and 114 before the cover molding process 142.

Figure 3:
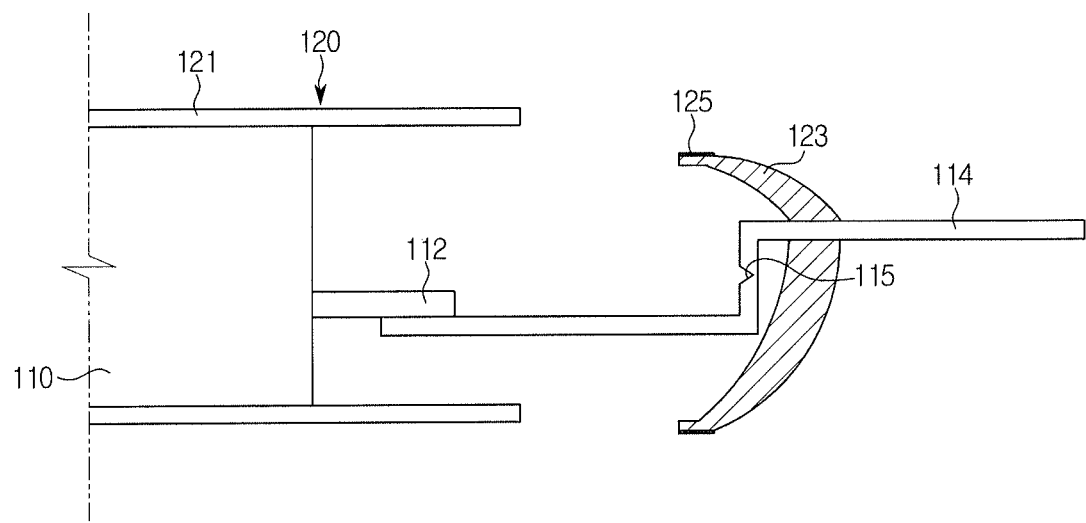
FIG. 3 is a view illustrating a lead tab connecting process in a method of manufacturing a pouch type secondary battery according to an exemplary embodiment of the present invention.

As shown in FIG. 3, in the lead tab coupling process 143, the linear lead tabs 113 and 114 (before a bending connection portion is formed) to which the covers 122 and 123 are coupled are connected to the electrode tabs 111 and 112 of the electrode assembly 110 through welding. At the present time, since the body 121 and the covers 122 and 123 of the pouch case 120 are spaced from each other, the lead tabs 113 and 114 may be coupled with minimized interference.

Figure 4:
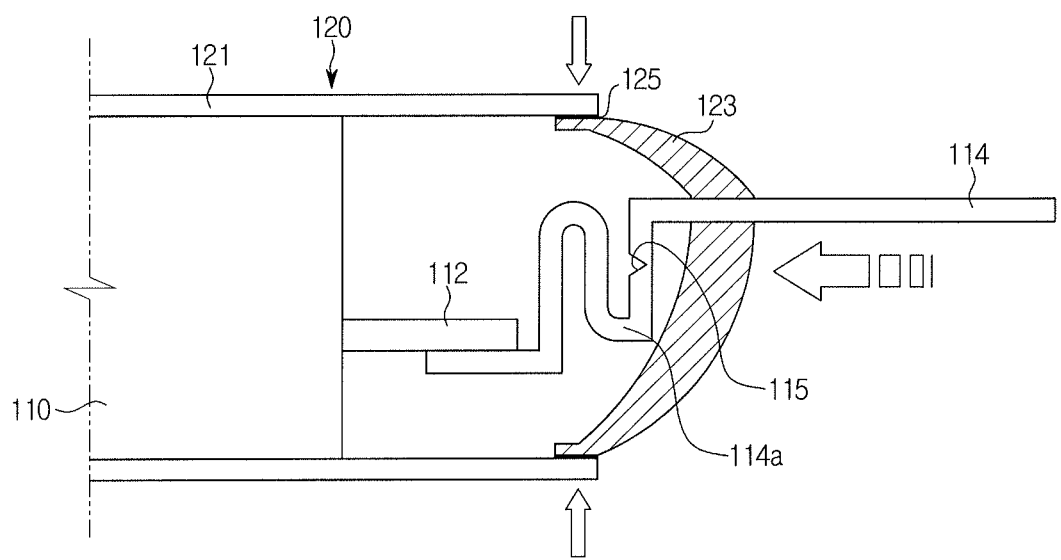
FIG. 4 is a view illustrating a cover coupling process in a method of manufacturing a pouch type secondary battery according to an exemplary embodiment of the present invention.

As shown in FIG. 4, in the bending connection portion forming process 144, the lead tabs (the lead tabs inside the covers) between the electrode tabs 111 and 112 and the covers 122 and 123 after the lead tabs 113 and 114 are coupled are bent into an 'S' shape so that the bending connection portions 113a and 114a are formed. A separate jig may be used to form the bending connection portions 113a and 114a. When the bending connection portions 113a and 114a are formed as described above, the circumferences of the covers 122 and 123 are positioned close to both end portions of the body 121 to be in a state of being engageable with the body 121.

In the cover coupling process 145, the sealants 125 previously attached at the circumferences of the covers 122 and 123 after the bending connection portions 113a and 114a are formed, are attached and sealed to the openings of the body 121 to complete the manufacturing process. In the present way, the electrode assembly 110, the electrode tabs 111 and 112, the bending connection portions 113a and 114a and the breaking portions 115 are positioned in a sealed state in the pouch case 120.

In the pouch type secondary battery 100 according to the exemplary embodiment of the present invention, due to the formation of the bending connection portions 113a and 114a, the portions where the breaking portions 115 (safety means) are formed on the lead tabs 113 and 114 may be positioned close to the electrode tabs 111 and 112, and the portions where the body 121 and the covers 122 and 123 of the pouch case 120 are connected may be positioned outside the portions where the electrode tabs 111 and 112 and the lead tabs 113 and 114 are connected. Accordingly, the energy density is configured for being increased by minimizing the spaces occupied by the portions where the electrode tabs 111 and 112 and the lead tabs 113 and 114 are connected and the portions where the breaking portions 115 are formed on the lead tabs 113 and 114 in the pouch case 120.

As shown in FIGS. 5 and 9, in the pouch type secondary battery 100 according to the exemplary embodiment of the present invention, when the pouch case 120 is expanded due to overheating of the electrode assembly 110 during an overcurrent or overcharging, the breaking portions 115 of the lead tabs 113 and 114 are cut off, interrupting the flow of current. Therefore, it is possible to prevent the pouch type secondary battery 100 from exploding.

Figure 7:
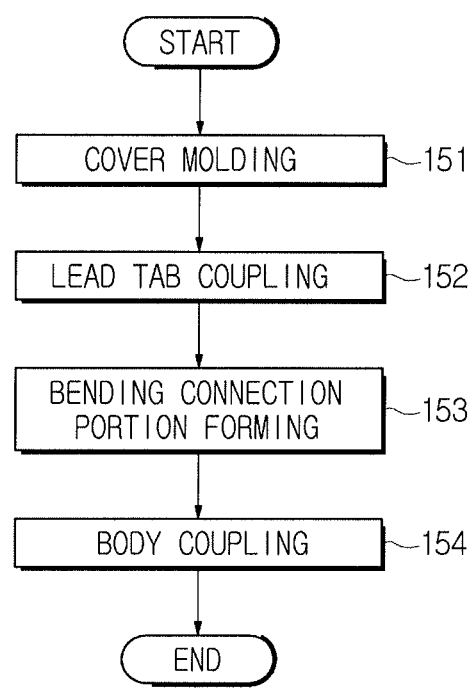
FIG. 7 and FIG. 8 illustrate a method of manufacturing a pouch type secondary battery according to another exemplary embodiment of the present invention.
Figure 8:
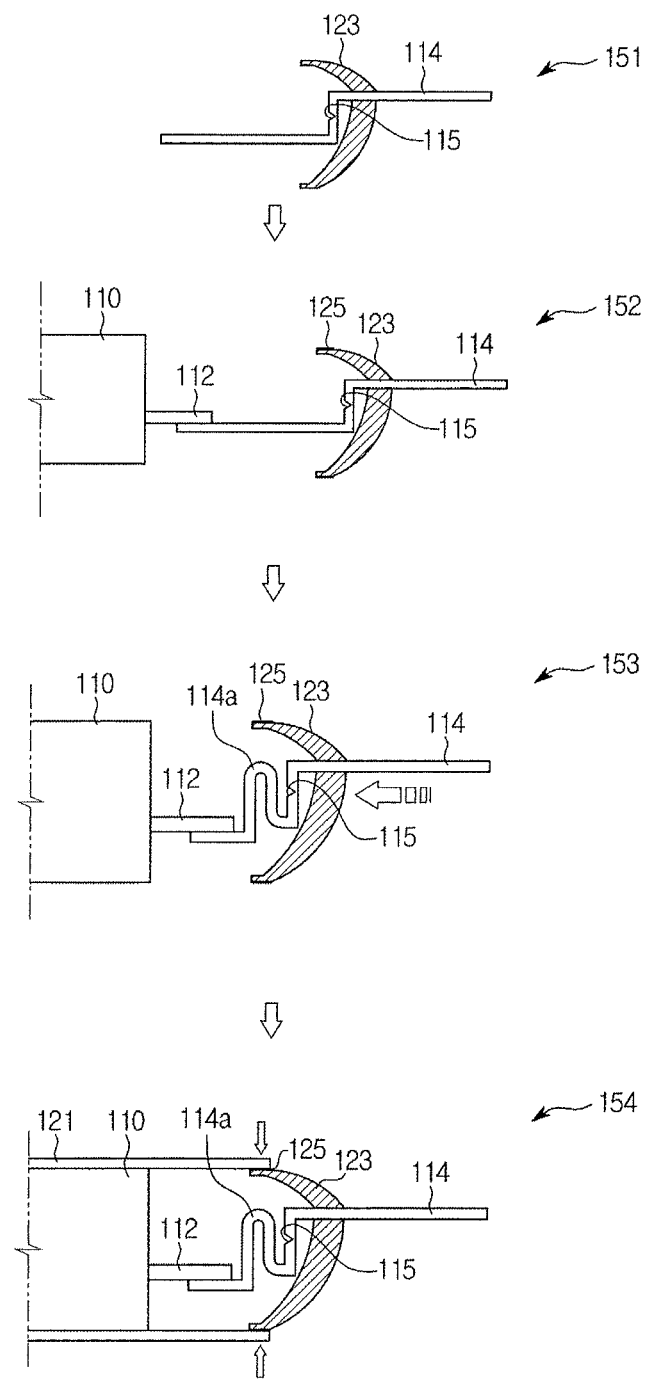

FIG. 7 and FIG. 8 illustrate another exemplary embodiment of a method of manufacturing a pouch type secondary battery. According to the manufacturing method illustrated in FIG. 7 and FIG. 8 different from the example of FIG. 6, the pouch type secondary battery 100 may be manufactured by sequentially performing a cover molding process 151, a lead tab coupling process 152, a bending connection portion forming process 153, and a body coupling process 154.

As described above, in the cover molding process 151, the covers 122 and 123 of the pouch case 120 are integrally molded with the lead tabs 113 and 114. Also in the example of FIGS. 7 and 8, the breaking portions 115 provided on the lead tabs 113 and 114 may be formed in a notch form on the surface of the lead tabs 113 and 114 before the cover molding process 151.

In the lead tab coupling process 152, the lead tabs 113 and 114 to which the covers 122 and 123 are coupled are connected to the electrode tabs 111 and 112 of the electrode assembly 110. At the present time, the bending connection portions 113a and 114a are not in a state of being formed in the lead tabs 113 and 114. Further. Furthermore, the body 121 of the pouch case 120 is not in a state of being coupled to the circumference of the electrode assembly 110.

In the bending connection portion forming process 153, the lead tabs (the lead tabs inside the covers) between the electrode tabs 111 and 112 and the covers 122 and 123 after the lead tabs 113 and 114 are coupled are bent into an 'S' shape to form the bending connection portions 113a and 114a.

In the body coupling process 154, the body 121 of the pouch case 120 is coupled to the circumference of the electrode assembly 110 after the bending connection portions 113a and 114a are formed and at the same time both end portions of the body 121 are sealingly coupled to the sealants 125 previously attached to the circumference of the covers 122 and 123 to complete the manufacturing.

The manufacturing method of the pouch type secondary battery of FIG. 6 and the manufacturing method of the pouch type secondary battery of FIG. 7 and FIG. 8 are partially different from each other in the processes, but can manufacture finally secondary batteries in the same form.

As is apparent from the above, in the pouch type secondary battery according to an exemplary embodiment of the present invention, the breaking portion (safety means) of the lead tab may be positioned close to the electrode tab by the formation of the bending connection portion, and the portions where the body of the pouch case is coupled to the covers of the pouch case may be positioned outside the portions where the electrode tabs and the lead tabs are connected to each other. Accordingly, the energy density may be increased by minimizing the spaces occupied by the connection portions of the electrode tabs and the lead tabs and the breaking portions formed on the lead tabs in the pouch case.

Furthermore, in the pouch type secondary battery according to an exemplary embodiment of the present invention, when an overcurrent flows, or the pouch case expands due to overheating of the electrode assembly, the current flow may be interrupted by the breakage of the lead tabs.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pouch type secondary battery comprising: an electrode assembly;
   electrode tabs connected to the electrode assembly;
   a pouch case to accommodate the electrode assembly and the electrode tabs in a sealed state;
   the pouch case comprises a body covering a circumference of the electrode assembly;
   the pouch case comprises covers sealingly coupled to first and second end openings of the body and through which the lead tabs penetrate at a first side of the covers; and
   lead tabs extending from an inside of the pouch case to an outside thereof by passing through the pouch case in a state of being connected to the electrode tabs, wherein the lead tabs include:
   a bending connection portion provided in the pouch case; and a breaking portion provided on a side of the bending connection portion to have a relatively small cross-sectional area and configured to be broken when an overcurrent is applied to the lead tabs or the pouch case expands;
   wherein the bending connection portion is bent in an 'S' shape, and the breaking portion is rovided in a notch form on a side adiacent to the cover.

2. The pouch type secondary battery according to claim 1, wherein the first and second end openings of the body and the covers are sealingly coupled by sealants applied to circumferences of the covers.

3. The pouch type secondary battery according to claim 1, wherein the lead tabs are integrally coupled to the cover when the cover is molded, and the bending connection portion is positioned inside the cover.

4. The pouch type secondary battery according to claim 1, wherein a portion of the bending connection portion is connected to the covers at a second side of the covers.

5. The pouch type secondary battery according to claim 4, wherein the breaking portion is disposed on the bending connection portion between the first side and the second side of the covers.

6. A method of manufacturing a pouch type secondary battery according to claim 1 comprising: coupling a body of a pouch case to a circumference of an electrode assembly provided with electrode tabs;
   molding covers of the pouch case in an integrated state with at least a portion of lead tabs;
   coupling the lead tabs to the electrode tabs;
   bending the lead tabs between the covers and the electrode tabs to form bending connection portions; and sealingly coupling circumferences of the covers to first and second end portions of the body after forming the bending connection portions.

7. The method of manufacturing the pouch type secondary battery according to claim 6, further including forming a breaking portion of a notch form on the lead tabs before the cover molding process.

8. A method of manufacturing a pouch type secondary battery according to claim 1 comprising: molding covers of a pouch case in an integrated state with at least a portion of lead tabs;

coupling the lead tabs to electrode tabs connected to an electrode assembly; bending the lead tabs between the covers and the electrode tabs to form bending connection portions; and coupling a body of the pouch case to a circumference of the electrode assembly after forming the bending connection portions and at a same time sealingly coupling first and second end portions of the body to circumferences of the covers.

9. The method of manufacturing the pouch type secondary battery according to claim 8, further including forming a breaking portion of a notch form on the lead tabs before the cover molding process.

\* \* \* \* \*